2,948,760
Patented Aug. 9, 1960

2,948,760
PRODUCTION OF DICHLORBUTENE

Clifford William Capp, Ewell, Henry Peter Crocker, Lower Kingswood, and Francis Edward Salt, Banstead, England, assignors to The Distillers Company Limited, Edinburgh, Scotland, a British company Filed May 7, 1957, Ser. No. 657,661

Claims priority, application Great Britain May 15, 1956

20 Claims. (Cl. 260—654)

The present invention relates to the production of chlorinated hydrocarbons, and in particular to an improved process for preparing dichlorbutenes by chlorination in the vapor phase.

The reaction of butadiene-1:3 with chlorine in the vapor phase at an elevated temperature, whereby additive chlorination takes place with the formation of dichlorbutenes, is well known. In this process some of the butadiene is converted into other chlorinated derivatives such as tetrachlorbutanes and compounds formed by substitutive chlorination such as chlorobutadienes thus reducing the yield of the desired dichlorbutenes.

It is an object of the present invention to provide an improved process for the production of dichlorbutenes, in which improved yields are obtained and the formation of undesired by-products is suppressed.

It is a further object of the present invention to provide an improved process for the production of dichlorbutenes by the additive chlorination of butadiene-1:3 derived from n-butane and/or n-butene.

According to the present invention the process for the production of dichlorbutenes by the additive chlorination of butadiene-1:3 in the vapor phase at an elevated temperature comprises carrying out the chlorination of the butadiene in the presence of an alkane and/or an alkene having four carbon atoms.

The alkanes and alkenes which are present during the additive chlorination of butadiene in the process of the present invention are butane, isobutane, butene-1, butene-2 or mixtures of butene and butane. Such mixtures, or mixtures of butane, butene and butadiene are readily available as fractions obtained in the distillation of cracked petroleum. In the reaction the alkane or alkene is substitutively chlorinated; thus butene is converted into monochlorbutene and butane is converted into monochlorbutane. A certain amount of additive chlorination of butane may take place. Thus if the alkene is n-butene small amounts of dichlorbutanes may be formed in addition to the products of substitutive chlorination.

The proportion of alkane and/or alkene to butadiene used in the chlorination is not critical and any ratio may be used, but the effect of the alkane or alkene in inhibiting side reactions will be less pronounced when it is present only as a small proportion of the total hydrocarbon in the reaction mixture. An example of a suitable source of the starting material for the process of the present invention is a crude $C_4$ stream from the distillation of cracked petroleum. This stream is subjected to extractive distillation with aqueous furfural, and n-butane, isobutane, butene-1 and isobutene are taken off overhead and a mixture of butene-2 and butadiene are removed as residue. Mixtures of butene and butadiene containing n-butane and minor amounts of iso-compounds such as isobutane and isobutene may also be available. Such mixtures are likely to be considerably cheaper than their components in the pure state.

The proportions of reactants in the chlorination are critical inasmuch as a molar ratio of hydrocarbon (including recycled alkane, alkene and butadiene):chlorine of less than about 1:1 results in the production of derivatives containing more than the desired amount of chlorine. It is preferred therefore to use molar ratios of total hydrocarbon:chlorine with excess of hydrocarbon. When a large excess of hydrocarbon is used it may be necessary to recover or recycle the unreacted hydrocarbon in order to make the process of the invention commercially economical.

It is desirable to preheat the hydrocarbon feed to the chlorination reactor to near reaction temperature before mixing with chlorine. Rapid and efficient mixing of the reactants is necessary if optimum yields are to be achieved.

The chlorination reaction is advantageously carried out in the presence of an inert gas or diluent such as nitrogen or preferably hydrogen chloride. The concentration of inert gas or diluent may vary widely for instance between about 5% and 50% by volume of the reaction mixture. It is preferred to use between about 10% and 50% by volume of hydrogen chloride. Since hydrogen chloride is formed as a by-product in the substitutive chlorination of hydrocarbons, it may not be necessary to provide an external source of hydrogen chloride in a recycle system, and the hydrogen chloride can be built up to any desired level by recycling the reactor exit gases after removal of the chlorinated products, part only of the recycle stream being treated for removal of hydrogen chloride to maintain the desired level.

The chlorination reaction can be carried out over a moderately wide temperature range, for instance between 300° and 500° C. Temperatures outside this range may be used but at temperatures above 500° C. the extent of substitutive chlorination of the butadiene to chlorbutadienes increases, and pyrolysis of dichlorbutenes may occur. Preferably the reaction is carried out between 330° and 420° C.

The chlorination reaction is preferably carried out at atmospheric pressure although increased or reduced pressures may be used if desired.

The chlorination reactor residence time is not critical and the optimum time varies for any particular reaction temperature. A preferred range of residence times is from less than 0.1 to 12 seconds, measured by relating the total volume of gas fed at atmospheric temperature and pressure to the reaction volume.

The chlorination reaction is carried out in any suitable reactor, for instance, in a tube packed, if desired, with inert packing material or with a catalyst, such as activated carbon impregnated with copper salts, or other suitable chlorination catalysts. It is preferred to carry out the reaction continuously in an empty tube in the absence of a catalyst.

The reaction may be carried out adiabatically or with heat removal from the reaction zone.

The reaction products may be worked up in any suitable manner, employing, for instance, distillation or extraction methods. Suitably the reactor exit gas is introduced into a column at the head of which unreacted hydrocarbons and hydrogen chloride are removed, while the chlorinated products are withdrawn from the kettle, and separated by fractionation suitably in a series of columns from which monochlorbutenes, dichlorbutanes, and dichlorbutenes are obtained as separate fractions. The hydrogen chloride may be separated from the head products by any convenient means, such as water scrubbing and the hydrocarbons recycled, preferably after drying. Alternatively the reactor products may be absorbed in a scrubbing system to scrub out the organic material, leaving gaseous dry hydrogen chloride as a valuable by-product of the reaction. Suitably the scrubbing medium used may be dichlorbutenes, from which the hydrocarbons may be separated for recycle to the reactor, the chlorinated products removed before recycling the dichlorbutenes to the scrubbing system. In a further method the chlorinated products are first removed from the reaction product by partial cooling or fractionation, before the latter is scrubbed to separate unreacted hydrocarbons from the hydrogen chloride.

Where the chlorination is carried out in the presence of hydrogen chloride as diluent it will not be necessary to remove all of the hydrogen chloride from the mixture of unreacted hydrocarbons, obtained by fractionating the reaction product, before recycling this mixture to the co-chlorination. In one embodiment of the invention the gaseous mixture of unreacted hydrocarbons and hydrogen chloride is cooled to liquefy most of the hydrocarbons with some of the hydrogen chloride, this liquid fraction being recycled to the chlorination reactor; the remainder of the hydrogen chloride can be recovered, for instance by absorption into water. Dry hydrogen chloride can also be separated from the gaseous mixture of hydrogen chloride and unreacted hydrocarbons by fractionation preferably under super-atmospheric pressure.

In a preferred embodiment of the present invention, hereinafter referred to as the "integrated process" a mixture comprising n-butene and butadiene-1:3 is subjected to chlorination, mono-chlorbutenes and/or dichlorbutanes are separated from the chlorination product and subjected to pyrolysis to produce butadiene, this butadiene is introduced to the chlorination stage and dichlorbutenes are recovered from the chlorination product. In a development of this integrated process the mixture subjected to chlorination comprises n-butane, which is converted to a mixture of 1- and 2-monochlorbutanes, a fraction comprising the monochlorbutanes is separated from the chlorination product, the said mono-chlorbutanes are subjected to pyrolysis to produce n-butenes, and this n-butene is introduced to the chlorination stage.

The initial starting material for the integrated process may thus comprise n-butane, n-butene-1, n-butene-2, mixtures of any of these compounds, and mixtures of any of these compounds with butadiene-1:3, which will be converted directly to dichlorbutenes.

In the integrated process the chlorination reaction is carried out over the same temperature range as is mentioned above. However, at the lower temperatures an increasing amount of addition chlorination of butene to dichlorbutanes takes place, and while, as indicated above, the dichlorbutanes will be converted to butadiene in the pyrolysis reaction the yields of butadiene obtained are only about 75%, the remainder of the dichlorbutanes being converted to vinyl chloride type chlorbutenes which have to be removed from the pyrolysis reaction product. It is therefore especially desirable to operate the chlorination at the preferred temperature range of 330° to 420° C., at which the maximum amount of substitution chlorination of the butene to monochlorbutenes takes place.

The products of the chlorination reaction in the integrated process consists mainly of 3-chlorbutene-1, 1-chlorbutene-2 and some 4-chlorbutene-1, together with some dichlorbutanes from the butene, and mainly of 3,4-dichlorbutene-1 and 1,4-dichlorbutene-2 from the butadiene, together with minor amounts of chlorbutadienes, tetrachlorbutanes and resinous products, and unreacted butene and butadiene. If the mixture subjected to chlorination comprises n-butane the chlorination product will contain 1- and 2-monochlorbutanes. The mono-chlorbutenes and dichlorbutanes, and monochlorbutanes, if present, are separated from the remainder of the reaction product as described below, before being submitted to pyrolysis, either as a single fraction, or the monochlorbutenes and dichlorbutanes may be separated and pyrolyzed separately. If monochlorbutanes are present in the chlorination product, these will generally be separated and pyrolyzed with the monochlorbutenes as their boiling points are very similar. While it is preferred to pass all of the mono-chlorbutenes, dichlorbutanes and monochlorbutanes to the pyrolysis reaction, if desired part only may be pyrolyzed, the remainder being recovered as valuable by-products of the process.

The pyrolysis reaction in the integrated process can be carried out over a relatively wide temperature range, for instance between 450° and 750° C., the optimum value depending on the residence time. Temperatures much below 450° C. are undesirable in view of the low rate of pyrolysis, while at temperatures higher than 750° C. cracking of the products takes place. It is preferred to operate at temperatures between 500° and 600° C. The pyrolysis reaction is preferably carried out in a non-catalytic manner, preferably in an unpacked reaction tube, but reaction chambers containing suitable packing material such as carbon chips, glass wool, pumice and the like may be used if desired.

The mono-chlorbutenes and the dichlorbutanes may be pyrolyzed together but in a preferred embodiment they are separated and pyrolyzed in separate reactors. In this way, the dichlorbutanes, which are more resistant to pyrolysis, can be subjected to more severe reaction conditions than is necessary for the monochlorbutenes, and the vinyl chlorides such as cis- and trans-2-chlorbutene-2, 1-chlorbutene-1 and 2-chlorbutene-1 which are formed in about 25% yield on the pyrolysis of dichlorbutanes, and which are even more resistant to conversion to butadiene are kept out of the main system. Vinyl-type chlorides, such as 2-chlorbutene-2, are also formed in 2–3% yield in the high temperature chlorination of butene, in addition to the main yield of allylic-type chlorides. These vinyl-type chlorides remain with the monochlorbutenes and pass through the pyrolysis reactor unchanged, therefore tending to build up in the system. It is a further preferred feature of the invention to feed continuously a part of the reaction product from the main pyrolysis reactor, preferably after separation of butadiene and hydrogen chloride therefrom, to the subsidiary dichlorbutane pyrolysis reactor. In this way, the vinyl-type chlorides can be kept at a convenient level in the system. The product from the subsidiary dichlorbutane pyrolysis reactor can be fractionated to recover butadiene which is fed to the chlorination reactor with or without the hydrogen chloride, mono-chlorbutenes and unreacted dichlorbutanes, which are recycled to the subsidiary pyrolysis, and the vinyl-type chlorides such as 2-chlorbutene-2, which can be pyrolyzed to butadiene in a further reactor under extreme catalytic conditions. The pyrolysis of dichlorbutanes may also give rise to small amounts of methyl-allene (i.e. butadiene-1:2) in addition to butadiene-1:3 which is the main product of pyrolysis of the mono-chlorbutenes as well as of the dichlorbutanes. If desired the butadiene formed in the subsidiary pyrolysis reactor may be converted to the 1:3-isomer by contacting with, for instance, fuller's earth at an elevated temperature. The amount of methyl-allene formed in the reactor is small, however, and it is preferred to pass the butadiene/hydrogen chloride fraction from the reactor products directly to the co-chlorination.

In another method of operation a fraction containing both monochlorbutenes and dichlorbutanes is separated from the chlorination product and submitted to pyrolysis in a primary reactor. The pyrolysis product is fractionated to recover butadiene which is fed to the chlorination reactor with or without the hydrogen chloride, and the unpyrolyzed residue is recycled to the pyrolysis. Part of the pyrolysis product, preferably after separation of butadiene and hydrogen chloride is continuously removed and passed to a secondary pyrolysis reactor operated under more severe conditions than the first. The product from the secondary pyrolysis reactor is also treated to separate the butadiene which is passed, with or without the hydrogen chloride to the chlorination.

The pyrolysis reaction product consists mainly of a mixture of butadiene and hydrogen chloride, with probably some unpyrolyzed monochlorbutenes. It will also contain n-butene if the feed to the pyrolysis reaction comprised monochlorbutanes. The pyrolysis product may be treated for the separation of the butadiene by any of the conventional methods such as scrubbing, solvent extraction, fractional distillation or condensation. The butadiene is then fed to the chlorination reactor, preferably after being adjusted to a temperature near that at which the chlorination is carried out, while unreacted monochlorbutenes are recycled to the pyrolysis reactor. Preferably a fraction consisting of butadiene and hydrogen chloride is separated from the pyrolysis reaction product and fed to the chlorination reactor, the hydrogen chloride then acting as a diluent for the chlorination reaction, while the unpyrolyzed monochlorbutenes are recycled to the pyrolysis. In another embodiment a fraction consisting of butadiene and hydrogen chloride is separated from the pyrolysis product and mixed with the effluent from the chlorination reactor, suitably at a point after chlorinated products have been removed therefrom. Alternatively the whole of the effluent from the pyrolysis reactor can be mixed with the effluent from the chlorination reactor at any suitable point. The butadiene and hydrogen chloride, and butene if present, in the pyrolysis product are then recovered together with the unreacted hydrocarbons and hydrogen chloride in the effluent from the chlorination reactor, and unpyrolyzed chlorbutenes and/or chlorbutanes are recovered with the chlorinated products. In this embodiment the necessity of providing a separate recovery system for the pyrolysis reaction product is obviated.

If butene is present in the pyrolysis reaction product this may be separated and introduced to the chlorination stage with the butadiene.

If the original feed contains butene-2, any dichlorbutane produced in the chlorination will be 2:3-dichlorbutane and this is readily separable from the monochlorbutenes and dichlorbutenes by distillation. If butene-1 is used as feed, 1:2-dichlorbutane will be formed, and separation of this from 3:4-dichlorbutene-1 by simple distillation is impossible, since the boiling points of the two compounds are very close. In this case, therefore, the two compounds may be separated by isomerizing the 3:4-dichlorbutene-1 to 1:4-dichlorbutene-2. 1:4-dichlorbutene-2 boils at a considerably higher temperature than its isomer, and can easily be separated from the 1:2-dichlorbutane by distillation. If desired the 1:4-dichlorbutene-2 can be isomerized back to the 3:4-isomer. It is possible, however, to adjust the reaction conditions of the chlorination stage to reduce the formation of dichlorbutanes to a very low value, for instance by controlling the reaction temperature as described above, and in many applications of the dichlorbutenes the presence of such small amounts of dichlorbutane may be tolerated, in which case the separation is unnecessary.

In starting up the integrated process butene and/or butane mixed with an external feed of butadiene may be fed to the chlorination reactor, and the amount of externally-added butadiene slowly reduced as butadiene, from the pyrolysis of the monochlorbutenes, builds up in the system. Alternatively, the initial feed may be butene and/or butane alone, in which case only very small amounts of dichlorbutenes will be produced at first (directly from the butene). The yields of dichlorbutenes will then increase as the butadiene builds up in the system to the required level. Butane alone is a suitable feedstock, but since the conversion of butane to butadiene by the integrated process gives rise to much by-product hydrogen chloride it may be advantageous partially to dehydrogenate the butane to a mixture of n-butene and butadiene, e.g. by the Houdry process, before use. The amount of by-product hydrogen chloride made in the process can then be varied at will by altering the ratios of butane/butene/butadiene in the feedstock.

The invention as embodied in the integrated process is further illustrated with reference to the accompanying drawings.

Figure 1:
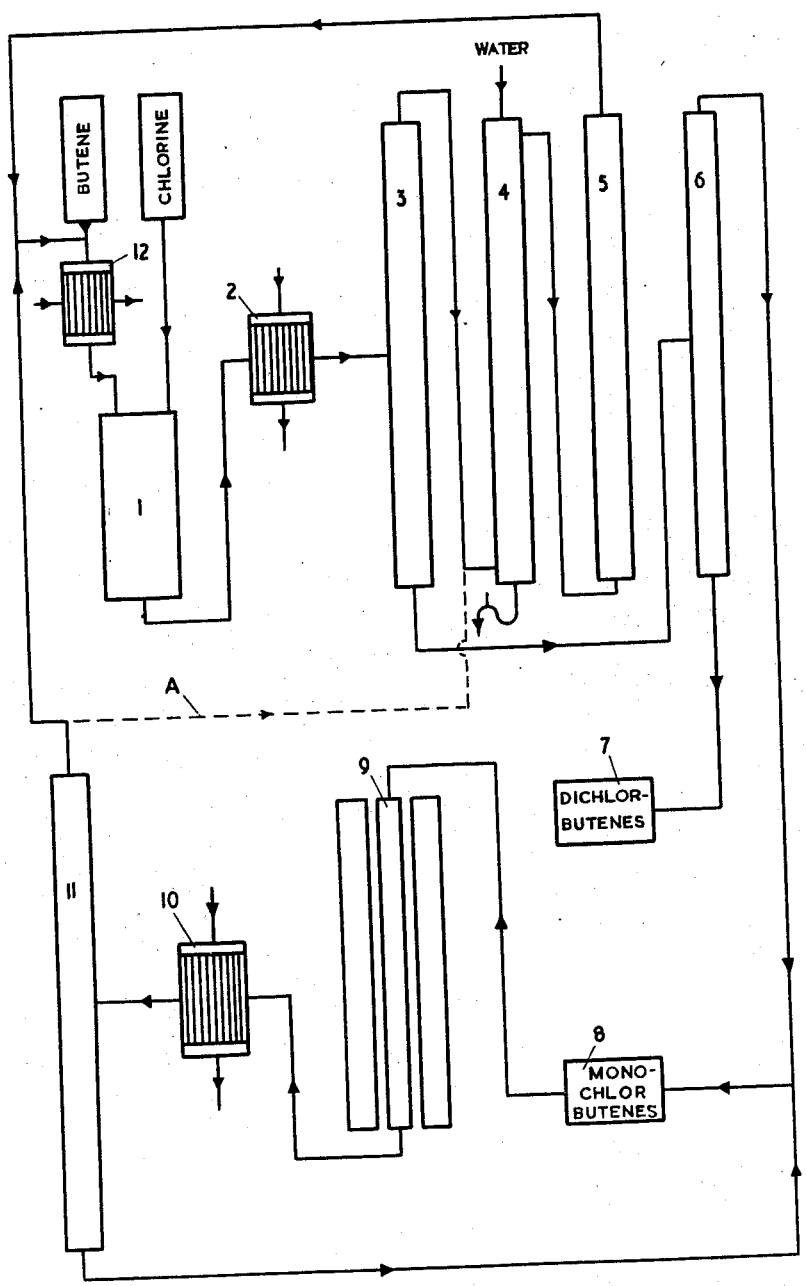
Figure 1 is a flow diagram of one embodiment of the present invention.

Referring to Figure 1 butene from storage, butadiene and hydrogen chloride from the head of column 11, and recycle butene and butadiene from the head of column 5 are preheated in preheater 12, and passed to the chlorination reactor 1, together with chlorine from storage. The products from the chlorination are cooled by heat exchanger 2, and passed to distillation column 3, at the foot of which a residue comprising mono-chlorbutenes and dichlorbutenes, together with minor amounts of dichlorbutanes, chlorbutadienes and tetrachlorbutanes is removed and fed to distillation column 6. At the head of column 3, butene, butadiene and hydrogen chloride are withdrawn, and passed to the scrubber 4, where hydrogen chloride is washed out with water. The washed butene/butadiene mixture is dried in column 5 and recycled to the chlorination reactor 1. At the foot of column 6, crude dichlorbutenes containing dichlorbutanes, chlorbutadienes and tetrachlorbutanes are removed for storage at 7 and further purification, for example by fractionation to give the pure product dichlorbutenes. Monochlorbutenes are removed from the head of column 6, and passed to storage 8, from where they are fed to the pyrolysis reactor 9. The pyrolysis products are cooled by heat exchanger 10 and passed to distillation column 11 from the head of which butadiene and hydrogen chloride are withdrawn and passed to the chlorination reactor 1. From the foot of column 11, unpyrolyzed monochlorbutenes are recycled to the pyrolysis reactor 9. The dotted line A illustrates an alternative arrangement in which the butadiene and hydrogen chloride from pyrolysis are passed to the scrubber 4, in which case no hydrogen chloride will be present at the chlorination stage.

Figure 2:
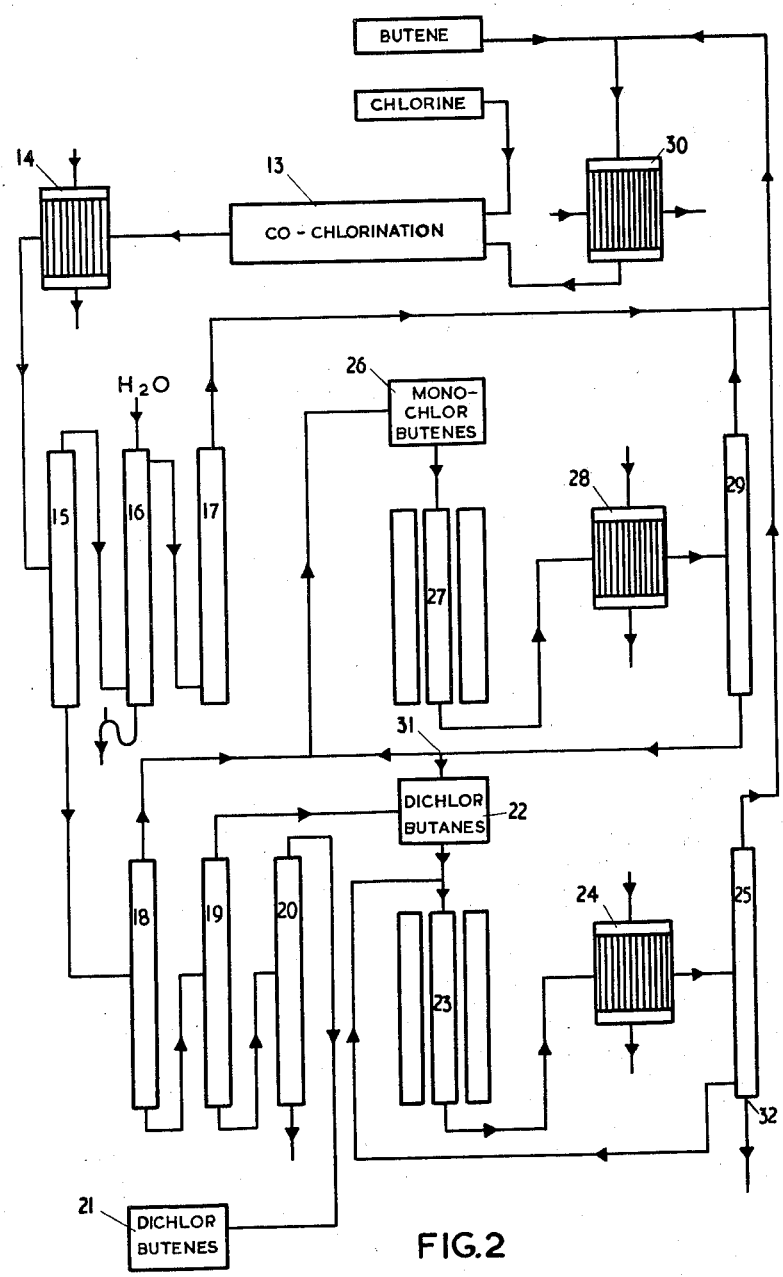
Figure 2 is a flow diagram of a second embodiment of the present invention.

Referring to Figure 2 the system illustrated is an elaboration of that shown in Figure 1, in which dichlorbutanes are separately pyrolyzed. Butene, from storage, butadiene and hydrogen chloride from the head of distillation columns 15 and 19, and recycle butene and butadiene from the head of distillation column 17 are preheated in preheater 30, and passed to the chlorination reactor 13, together with chlorine from storage. The products from the chlorination are cooled by heat-exchanger 14, and passed to distillation column 15 at the head of which butene, butadiene and hydrogen chloride are withdrawn and passed to the bottom of scrubber 16 in which the hydrogen chloride is scrubbed out with water. The butene/butadiene mixture is dried in column 17 and recycled to the chlorination reactor 13. At the foot of column 15 monochlorbutenes, dichlorbutenes, dichlorbutanes, and minor amounts of chlorbutadienes, tetrachlorbutanes and resinous products, are withdrawn and passed to a series of distillation columns 18, 19 and 20. At the head of 18 monochlorbutenes together with traces of chlorbutadienes, are withdrawn and fed to storage 26; at the head of 19, dichlorbutanes are withdrawn and fed to storage 22; and at the head of 20 dichlorbutenes are withdrawn to storage 21. At the foot of column 20 a residue of tetrachlorbutanes and polymers is withdrawn.

The monochlorbutenes from storage 26 are fed to the pyrolysis reactor 27, and the products are cooled by heat-exchanger 28 and passed to distillation column 29, from the head of which butadiene and hydrogen chloride are withdrawn and passed to the chlorination reactor 13. At the foot of column 29, unpyrolyzed monochlorbutenes are recycled to the pyrolysis reactor 27.

The dichlorbutanes from storage 22 are pyrolyzed separately in reactor 23 which is operated at higher temperatures than the reactor 27. The pyrolysis products are passed to the heat-exchanger 24 where they are cooled, and are then fed to distillation column 25, from the head of which butadiene and hydrogen chloride are recycled to the chlorination reactor 13. From the foot of column 25 a mixture of monochlorbutenes and unreacted dichlorbutanes is recycled to the reactor 23.

A bleed from the main pyrolysis system 27/29 is removed at 31 and passed to the subsidiary pyrolysis reactor 23 to prevent build up of vinyl-type chlorides in the system. At the foot of column 25 an ultimate bleed of vinyl-type chlorides is removed at 32. If desired this bleed can be passed to a further catalytic reactor (not shown) for conversion to butadiene, mainly the 1:2-isomer being produced.

Referring to the process of the present invention generally, this has a number of advantages over prior art chlorination processes. Firstly the starting material need not be pure but can consist of any available mixture of $C_4$ alkanes, alkenes, and butadiene. Such impure mixtures are likely to be cheaper and more readily available than the pure components, and can be obtained, for instance, from a crude $C_4$ stream from the distillation of cracked petroleum. Secondly, it has been found that the chlorination of butadiene in admixture with $C_4$ alkanes and alkenes results in higher yields of dichlorbutenes than can be obtained when butadiene is chlorinated alone, and that the formation of undesirable higher boiling products is much reduced. The formation of other by-products, particularly 1-chlorbutadiene, is also appreciably reduced. It is also possible to use substantially higher reaction temperatures, and consequently a much higher reaction rate, giving economy in reactor size, than when butadiene is chlorinated alone. Referring to the integrated process, the products of both additive and substitutive chlorination of butene, i.e. the dichlorbutanes and the monochlorbutenes, are utilized in the pyrolysis reaction for the production of butadiene, and the small amount of dichlorbutene formed directly from butene, and which it is not economical to recover in a straight butene chlorination is recovered with the dichlorbutenes formed from the butadiene. Furthermore, it is only necessary in the integrated process to remove hydrogen chloride from the system at one point. In a process in which the butene and butadiene were chlorinated separately and the products from the butene pyrolyzed it would be necessary to arrange for the removal of hydrogen chloride probably at three points, i.e. after each individual chlorination step, and after the pyrolysis step. A further advantage of the integrated process is that the small amount of n-butene formed during the pyrolysis of the monochlorbutenes and/or dichlorbutanes is utilized. In a process in which butene and butadiene were chlorinated separately, and the products from the butene pyrolyzed, the butene formed during the pyrolysis would have to be separated from the butadiene, which is a difficult and expensive operation, or would be wasted.

The products of the process of the present invention consist mainly of 3:4-dichlorbutene-1 and 1:4-dichlorbutene-2 from the butadiene, and of the monochlor-substituted derivatives of the alkanes and alkenes, where these are not utilized in the integrated process. The products of the present invention are valuable intermediates, for example in the preparation of chloroprene.

The following comparative examples are given further to illustrate the process of the present invention.

EXAMPLE 1

An apparatus for the continuous chlorination of n-butane and butadiene at atmospheric pressure consisted of an unpacked tube heated in a bath of molten mixture of sodium nitrite and potassium nitrate. Chlorine, and a preheated mixture of n-butane and an equimolar mixture of butadiene and hydrogen chloride were separately fed into the reactor. The effluent from the reactor was fed to a fractionating column at the kettle of which chlorination products were continuously withdrawn. At the head of the column a mixture of butane, butadiene and hydrogen chloride was withdrawn, scrubbed with water to remove hydrogen chloride, dried and recycled to the chlorination reactor.

Under steady conditions, the feed to the chlorination reactor, including recycle gases, was as given in Table 1, run 1. The products were analyzed by fractionation and examination of the fractions by infra-red and gas chromatographic methods. The results are shown in Table 2, run 1.

By way of comparison with the above example, when butadiene was chlorinated in the absence of butane (Table 1, run 2) with hydrogen chloride as diluent in a similar apparatus a lower yield of dichlorbutene was obtained, (Table 2, run 2), owing to the formation of more low-boiling by-products, such as monochlorbutadienes.

Table 1

| Run No. | Reactor volume in vols. | Gas flow, vol./hr. at S.T.P. | | | | Residence time (seconds) | Reactor temp. (°C.) |
|---|---|---|---|---|---|---|---|
| | | n-Butane | Butadiene | Chlorine | Hydrogen chloride | | |
| 1 | 3 | 15,800 | 15,900 | 6,800 | 15,900 | 0.28 | 394 |
| 2 | 5 | Nil | 21,700 | 5,500 | 21,700 | 0.66 | 406 |

Table 2

| Run No. | Molar ratio of products derived from | | | | | Higher Boiling derivatives per cent weight/weight of product |
|---|---|---|---|---|---|---|
| | n-Butane | | Butadiene | | | |
| | Chlorobutanes | Dichlorobutane | Chlorobutadienes | Dichlorobutenes | Higher Boiling derivatives [1] | |
| 1 | 94.9 | 5.1 | Nil | 95.6 | 4.4 | 3.2 |
| 2 | Nil | Nil | 11.4 | 85.4 | 3.2 | 5.1 |

[1] Expressed as tetrachlorbutanes

EXAMPLE 2

Butene-2 and butadiene were chlorinated in admixture, in an apparatus similar to that described in Example 1. No hydrogen chloride diluent was used. The products were recovered in the same way as described in Example 1. The results are shown in Table 3, run 3.

By way of comparison, runs 4 and 5 of Table 3 illustrate the results obtained when butene-2 and butadiene respectively were chlorinated separately.

Examples 4 and 5 are given to illustrate the integrated process of the present invention.

EXAMPLE 4

Butene-2 and butadiene were continuously chlorinated in the apparatus illustrated in Figure 1. Recycle butene and butadiene, fresh butene feed, and an equimolar mixture of butadiene and hydrogen chloride from the pyrolysis were preheated and fed at atmospheric pressure to the chlorination reactor which consisted of an unpacked

Table 3

| Reaction conditions | | | Run No. | | |
|---|---|---|---|---|---|
| | | | 3 | 4 | 5 |
| Reactor volume in vols | | | 5 | 3 | 5 |
| Gas flow, volumes/hour at S.T.P | | Butene | 66,600 | 30,000 | Nil |
| | | Butadiene | 16,400 | Nil | 20,000 |
| | | Chlorine | 6,400 | 9,500 | 4,560 |
| Residence time (as defined herebefore), seconds | | | 0.61 | 0.27 | 0.71 |
| Reactor temperature, °C | | | 390 | 410 | 390 |
| Molar ratio of products derived from | Butene-2 | Monochlorbutene | 96.3 | 83.0 | Nil |
| | | Dichlorbutane | 3.7 | 11.3 | Nil |
| | Buta-diene | Chlorbutadiene | 2.1 | Nil | 3.4 |
| | | Dichlorbutene | 94.8 | Nil | 84.8 |
| | | Higher boiling derivatives[1] | 3.1 | Nil | 11.8 |
| Higher boiling derivatives, percent weight/weight of product | | | 3.6 | 1.8 | 8.9 |

[1] Expressed as tetrachlorbutane.

The results show that when the butadiene was chlorinated in the presence of butene-2 a substantially higher yield of dichlorobutenes was obtained, owing to reduced formation of chlorbutadiene and higher-boiling by-products. The yield of products derived from the butene-2 was also markedly increased over those obtained when butene-2 was chlorinated alone.

EXAMPLE 3

A reactor for the continuous chlorination of a mixture of n-butene-1, containing 20% of n-butene-2, with butadiene consisted of a lagged metal tube. The mixture of hydrocarbons was preheated to 230° C. and mixed with the chlorine at a T-piece just before entering the reactor. The temperature gradient in the reactor, which was not externally heated, rose to 360° C. The effluent from the reactor was fed to a fractionating column at the kettle of which chlorination products were continuously withdrawn. At the head of the column a mixture of butene, butadiene and hydrogen chloride was withdrawn, scrubbed with water to remove hydrogen chloride, dried, and recycled to the chlorination reactor. The flow rates and results are shown in Table 4.

tube heated in a bath of molten mixture of sodium nitrite and potassium nitrate. Chlorine was fed separately to the reactor. The effluent from the reactor, after cooling, was fractionated as shown in Figure 1, to obtain aqueous hydrogen chloride, a dry mixture of butene and butadiene which was recycled to the chlorination, mono-chlorbutenes which were returned to storage for pyrolysis to butadiene and hydrogen chloride, and a fraction containing dichlorbutenes, dichlorbutanes and higher boiling derivatives. The dichlorbutene fraction was analysed by fractionation and examination of the fractions by infrared and gas chromatographic methods, and samples of the mono-chlorbutenes were simply analyzed. The mono-chlorbutenes were pyrolyzed at about 580° to 600° C., and the pyrolysis products were cooled and fractionated to obtain a butadiene/hydrogen chloride fraction which was passed to the chlorination, and a fraction containing unpyrolyzed monochlorobutenes which were recycled to the pyrolysis.

Three runs were carried out in accordance with the process of Figure 1 under steady conditions; the feeds to the chlorination including recycle gases and the products obtained were as shown in Table 5.

Table 4

| Reaction conditions | | | Run 6 |
|---|---|---|---|
| Reactor volume in vols | | | 6.9 |
| Gas flow, vols./hour at S.T.P | | Butene (80% butene-1) | 1,180 |
| | | Butadiene | 1,170 |
| | | Chlorine | 2,360 |
| Residence time (as defined herebefore), seconds | | | 2.0 |
| Molar ratio of products derived from | Butene | Monochlorbutene | 89.6 |
| | | Dichlorbutene | 9.4 |
| | Butadiene | Chlorbutadiene | 1.5 |
| | | Dichlorbutene | 93.6 |
| | | Higher boiling derivatives[1] | 4.8 |
| Higher boiling derivatives, percent weight/weight of product | | | 2.1 |

[1] Expressed as tetrachlorbutane.

Table 5

| Reaction conditions | | Run No. | | |
|---|---|---|---|---|
| | | 7 | 8 | 9 |
| Reactor volume in vols | | 3 | 3 | 3 |
| Gas flow vols./hour at STP | Butene | 20,000 | 15,400 | 19,600 |
| | Butadiene | 13,700 | 14,400 | 10,400 |
| | Chlorine | 6,000 | 7,900 | 7,300 |
| | Hydrogen chloride | 3,100 | 4,300 | 2,600 |
| Residence time (as defined herebefore), seconds | | 0.26 | 0.26 | 0.27 |
| Reaction temperature, °C | | 395 | 420 | 390 |
| RESULTS | | | | |
| Molar ratio of products derived from | Butene | Monochlorbutene | 84 | 90.5 | 84 |
| | | Dichlorbutane | 15.3 | 8.6 | 15.5 |
| | Butadiene | Monochlorbutadiene | 4.9 | 5.5 | 3.9 |
| | | Dichlorbutene | 91.6 | 90.7 | 93.6 |
| | | Higher boiling derivatives [1] | 3.5 | 3.9 | 2.5 |

[1] Expressed as tetrachlorbutane.

EXAMPLE 5

Butene-2 and butadiene were continuously chlorinated as illustrated in Figure 1, in a reactor which consisted of a lagged metal tube. Recycle butene and butadiene, fresh butene feed, and butadiene from pyrolysis were preheated and fed at atmospheric pressure to the chlorination reactor which was not externally heated. Chlorine was fed separately to the reactor. No hydrogen chloride diluent was present. The effluent from the reactor, after cooling, was fractionated as shown in Figure 1 to obtain aqueous hydrogen chloride, a dry mixture of butene and butadiene which was recycled to the chlorination, monochlorbutenes which were returned to storage for pyrolysis to butadiene, and a fraction containing dichlorbutenes, dichlorobutanes and higher boiling derivatives. The monochlorobutenes were pyrolyzed at about 580° to 600° C., and a fraction consisting of butadiene and hydrogen chloride was separated from the pyrolysis products and passed to the scrubber 4, by line A. Unpyrolyzed monochlorbutenes were recycled to the pyrolysis reactor.

The dichlorbutene fraction was analyzed by fractionation and examination of the fractions by infrared and gas chromatographic methods, and samples of the monochlorbutenes were similarly analyzed.

Three runs were carried out at different temperatures. The results are shown in Table 6.

Table 6

| Reaction conditions | | Run No. | | |
|---|---|---|---|---|
| | | 10 | 11 | 12 |
| Reactor volume in vols | | 69 | 69 | 69 |
| Gas flow vols./hour at S.T.P | Butene | 5,500 | 5,500 | 5,500 |
| | Butadiene | 5,000 | 5,000 | 5,000 |
| | Chlorine | 2,400 | 2,400 | 2,400 |
| Residence time (seconds) | | 1.9 | 1.9 | 1.9 |
| Preheating temperature, °C | | 190 | 200 | 210 |
| Reaction temperature, °C | | 360 | 370 | 380 |
| RESULTS | | | | |
| Molar ratio of products derived from | Butene | Monochlorbutene | 90.0 | 91.5 | 91.2 |
| | | Dichlorbutane | 7.2 | 5.4 | 4.9 |
| | Butadiene | Chlorbutadiene | 3.0 | 4.1 | 4.5 |
| | | Dichlorbutene | 91.5 | 91.1 | 91.2 |
| | | Higher boiling derivatives | 5.5 | 4.7 | 4.3 |
| Higher boiling derivatives, percent weight/weight of product | | 2.1 | 1.8 | 1.7 |

We claim:

1. The process for the production of dichlorbutenes by the additive chlorination of butadiene-1:3 which comprises carrying out the chlorination of the butadiene in the vapor phase at an elevated temperature in the presence of another carbon selected from the group consisting of alkanes and alkenes each having four carbon atoms, and forming substantial amounts of dichlorbutenes as well as substantial amounts of a chlorinated hydrocarbon from a hydrocarbon of said group.

2. The process for the production of dichlorbutenes by the additive chlorination of butadiene-1:3 in the vapor phase at an elevated temperature, which comprises carrying out the chlorination of the butadiene in the presence of n-butene and forming substantial amounts of dichlorbutenes as well as substantial amounts of chlorinated n-butene.

3. The process for the production of dichlorbutenes by the additive chlorination of butadiene-1:3 in the vapor phase at an elevated temperature, which comprises carrying out the chlorination of the butadiene in the presence of a mixture of n-butene with n-butane forming substantial amounts of dichlorbutenes as well as substantial amounts of chlorinated n-butene and n-butane.

4. The process as claimed in claim 1, wherein the molar ratio of total hydrocarbon to chlorine is at least 1:1.

5. The process as claimed in claim 1, wherein the residence time in the chlorination is between about 0.1 and 12 seconds.

6. The process for the production of dichlorbutenes by the additive chlorination of butadiene-1:3 in the vapor phase at an elevated temperature, which comprises carrying out the chlorination of the butadiene in the presence of n-butene, forming a mixture of substantial amounts of dichlorbutenes as well as substantial amounts of chlorinated products of n-butene separating at least one of the substances monochlorbutene and dichlorbutane from the mixture, subjecting the same to pyrolysis to produce butadiene, introducing this butadiene to the chlorination stage, and recovering dichlorbutenes from the chlorination product.

7. The process as claimed in claim 6, wherein the pyrolysis reaction is carried out at a temperature between 450° and 750° C.

8. The process as claimed in claim 6, wherein the pyrolysis is carried out at a temperature between 500° and 600° C.

9. The process as claimed in claim 6, wherein a fraction containing monochlorbutenes and a fraction containing dichlorbutanes are separated from the chlorination product, and the two fractions are pyrolyzed in separate reactors.

10. The process as claimed in claim 9, wherein part of the product of the monochlorbutene pyrolysis reactor, after separation of butadiene and hydrogen chloride therefrom, is continuously fed to the dichlorbutanes pyrolysis reactor.

11. The process as claimed in claim 6, wherein a fraction containing both monochlorbutenes and dichlorbutanes is separated from the chlorination product and pyrolyzed in a primary pyrolysis reactor, and part of the primary pyrolysis reactor product is passed to a secondary pyrolysis reactor operated under more severe conditions than the primary reactor.

12. The process as claimed in claim 6, wherein the chlorination is carried out in the presence as diluent of the hydrogen chloride formed in the pyrolysis reaction.

13. The process which comprises simultaneously chlorinating butadiene and n-butene in the same reactor to produce dichlorbutenes and other products comprising monochlorbutenes and dichlorbutanes, pyrolyzing the monochlorbutenes to produce butadiene, and passing said butadiene to said reactor for chlorination.

14. The process for the production of dichlorbutenes by the additive chlorination of butadiene-1:3 in the vapor phase at an elevated temperature, which comprises carrying out the chlorination of the butadiene in the presence of n-butene, forming a mixture of substantial amounts of dichlorbutenes and substantial amounts of chlorinated n-butene at about 300°–500° C., separating at least one of the substances monochlorbutene and dichlorbutane from the mixture and subjecting same to pyrolysis to produce a fraction containing butadiene and hydrogen chloride and a fraction containing unpyrolyzed material, passing the butadiene and hydrogen chloride to the chlorination stage, and recycling the unpyrolyzed material to the pyrolysis reaction.

15. The process for the production of dichlorbutenes by the additive chlorination of butadiene-1:3 in the vapor phase at an elevated temperature, which comprises carrying out the chlorination of the butadiene in the presence of n-butene, forming a mixture of substantial amounts of dichlorbutenes and substantial amounts of chlorinated n-butene at about 300°–500° C., separating at least one of the substances monochlorbutene and dichlorbutane from the mixture and subjecting same to pyrolysis to produce a first fraction containing butadiene and hydrogen chloride and another fraction containing upyrolyzed material, mixing said first fraction with unreacted hydrocarbons and hydrogen chloride from the chlorination product, re-introducing at least the hydrocarbons in this mixture to the chlorination stage, and recycling said unpyrolyzed material to the pyrolysis reaction.

16. The process for the production of dichlorbutenes by the additive chlorination of butadiene-1:3 in the vapor phase at an elevated temperature, which comprises carrying out the chlorination of the butadiene in the presence of n-butene, forming a mixture of substantial amounts of dichlorbutenes and substantial amounts of chlorinated n-butene at about 300°–500° C., removing the mixture from the chlorination stage, separating from said product at least one of the substances monochlorbutene and dichlorbutane and subjecting same to pyrolysis to produce a product containing butadiene, mixing the product of pyrolysis with said chlorination product, separating from the mixture a fraction containing hydrocarbons and hydrogen chloride, and introducing said fraction to the chlorination stage.

17. The process for the production of dichlorbutenes by the additive chlorination of butadiene-1:3 in the vapor phase at an elevated temperature, which comprises carrying out the chlorination of the butadiene in the presence of n-butane, forming a mixture of substantial amounts of dichlorbutenes as well as substantial amounts of chlorinated products of n-butane, separating from the mixture a fraction comprising monochlorbutane, subjecting said monochlorbutane to pyrolysis to produce n-butene, introducing the n-butene to the chlorination stage, and recovering dichlorbutenes from the chlorination product.

18. The process for the production of dichlorbutenes by the additive chlorination of butadiene-1:3 in the vapor phase at an elevated temperature, which comprises carrying out the chlorination of the butadiene in the presence of n-butane and n-butene, forming a mixture of substantial amounts of dichlorbutenes as well as substantial amounts of chlorinated products of n-butane and n-butene, separating from the mixture monochlorbutane and at least one of the substances monochlorbutene and dichlorbutane, subjecting the same to pyrolysis to produce n-butene and butadiene, introducing this n-butene and butadiene to the chlorination stage, and recovering dichlorbutenes from the chlorination product.

19. The process for the production of dichlorbutenes by the additive chlorination of butadiene-1:3 which comprises carrying out the chlorination of the butadiene in the vapor phase at a temperature no greater than about 500° C. in the presence of another hydrocarbon selected from the group consisting of alkanes and alkenes each having four carbon atoms, and forming substantial amounts of dichlorbutenes as well as substantial amounts of a chlorinated hydrocarbon from a hydrocarbon of said group.

20. The process for the production of dichlorbutenes by the additive chlorination of butadiene-1:3 which comprises carrying out the chlorination of the butadiene in the vapor phase at a temperature in the range about 330° C. to about 420° C. in the presence of another hydrocarbon selected from the group consisting of alkanes and alkenes each having four carbon atoms, and forming substantial amounts of dichlorbutenes as well as substantial amounts of a chlorinated hydrocarbon from a hydrocarbon of said group.

References Cited in the file of this patent

UNITED STATES PATENTS

| | | |
|---|---|---|
| 2,343,107 | Cass et al. | Feb. 29, 1944 |
| 2,369,117 | Carter | Feb. 13, 1945 |
| 2,379,708 | Hearne | July 3, 1945 |
| 2,484,042 | Mahler | Oct. 11, 1949 |
| 2,612,530 | Cherniavsky et al. | Sept. 30, 1952 |

UNITED STATES PATENT OFFICE

CERTIFICATE OF CORRECTION

Patent No. 2,948,760                                    August 9, 1960

Clifford William Capp et al.

It is hereby certified that error appears in the printed specification of the above numbered patent requiring correction and that the said Letters Patent should read as corrected below.

Column 8, line 47, for "monochlorbutadienes" read -- monochlorobutadienes --; column 9, Table 4, first column, for "Dichlorbutene", first occurrence, read -- Dichlorbutane --; column 11, line 75, for "carbon" read -- hydrocarbon --.

Signed and sealed this 4th day of April 1961.

(SEAL)
Attest:   ERNEST W. SWIDER
Attesting Officer

ARTHUR W. CROCKER
Acting Commissioner of Patents